Patented Sept. 11, 1934

1,973,000

UNITED STATES PATENT OFFICE 1,973,000

RUBBER LIKE MASSES FROM BUTADIENE HYDROCARBONS AND POLYMERIZABLE NITRILES

Erich Konrad, Leverkusen, and Eduard Tschunkur, Cologne-Mulheim, Germany, assignors to I. G. Farbenindustrie Aktiengesellschaft, Frankfort-on-the-Main, Germany No Drawing. Application April 20, 1931, Serial No. 531,612. In Germany April 25, 1930

9 Claims. (Cl. 260—6)

The present invention relates to a process of preparing mixed rubber-like masses and to the new mixed rubber-like masses obtainable by said process.

In accordance with the present invention valuable mixed rubber-like masses are obtained by polymerizing according to any desired method a mixture of a butadiene hydrocarbon of the formula

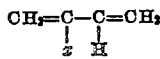

wherein $x$ means hydrogen or alkyl, and of a compound of the formula

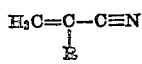

wherein R means hydrogen or alkyl.

In order to obtain polymerization products of pronounced and valuable rubber-like properties, it is necessary to apply the butadiene hydrocarbon in an amount surmounting about 60% by weight of the polymerizable compounds being present. The best results are obtained, when performing the polymerization process by simple heating of the polymerization mixture, for example, to a temperature between about 30–100° C., or by emulsifying the mixture of the polymerizable compounds with water in the presence of an emulsifying agent, such as a soap, an alkali metal salt of an alkylated naphthalene sulfonic acid, an emulsifying agent of acidic character, more particularly a salt of a high molecular base with an inorganic or organic acid, such as the chlorhydrate or acetate of diethylaminoethyloleylamide, the chlorhydrate of pentadecylglyoxalidine, the chlorhydrate of diethylaminoethoxyoleylanilide etc. Likewise, instead of or in combination with an emulsifying agent as mentioned above, emulsoid colloids, such as glue, albumen, blood fibrine, starch etc. may be applied to facilitate the emulsion of the compounds to be polymerized with water. The emulsions thus obtained are then caused to polymerize, advantageously while shaking or stirring at normal or elevated temperature, for example, at a temperature between about 30–100° C. Lower or higher temperatures are likewise operable. Obviously, other ingredients known to favorably influence polymerization processes, such as oxygen, substances being able to split off oxygen under the conditions of working, electrolytes etc. may be added to the polymerization mixture.

Likewise, other polymerizable compounds, such as styrol, vinylnaphthalene etc. may be applied in admixture with the butadiene hydrocarbon and the acrylic acid derivative, care being taken that the butadiene hydrocarbon is always present in an amount surmounting about 60% by weight of the mixture of the polymerizable compounds present.

In many cases the polymerization products are obtained in form of a latex-like emulsion, which can be coagulated according to usual methods, for example, by freezing out, or by adding a suitable acid or an alkali metal salt, such as sodium chloride, potassium chloride etc.

The mixed rubber-like masses thus obtainable are very plastic on rollers, absorb fillers well and yield vulcanization products of superior and soft, rubber-like properties, especially in admixture with highly dispersed fillers, such as carbon black, colloidal zinc oxide, colloidal silicic acid etc.

The following examples illustrate our invention without, however, restricting it thereto:—

*Example 1*

50 parts by weight of butadiene or isoprene and 17 parts by weight of acrylic acid nitrile (CH₂=CH—C N) are emulsified with 60 parts by weight of a 5% aqueous solution of the hydrochloride of diethylaminoethyloleylamide and 0.5 part by weight of trichloro acetic acid and polymerized for three to four days at 50–60° C. with agitation of the emulsion. There is produced in quantitative yield a polymerization product which can be worked up very satisfactorily on the rollers, and yields, for example, in admixture with soot vulcanization products of very high strength.

*Example 2*

25 parts by weight of acrylic acid nitrile
25 parts by weight of butadiene-(1.3)
70 parts by weight of a 3% aqueous solution of the hydrochloride of diethylaminoethoxyoleylanilide and
3 parts by weight of In acetic acid are emulsified together, for example, by intensive shaking, and polymerized for three days at about 60° C. Thus is obtained a latex-like mass, from which by coagulation, for example, by an addition of acids or by freezing out, there can be produced in almost quantitative yield a strong, plastic polymerization product, which after vulcanization in admixture with soot yields a rubber-like product of very satisfactory strength and extensibility.

Example 3

25 parts by weight of acrylic acid nitrile
70 parts by weight of butadiene-(1.3)
20 parts by weight of a 3% aqueous solution of the hydrochloride of diethylaminoethoxyoleylanilide and
120 parts by weight of a 10% aqueous solution of the sodium salt of isobutyl-naphthalene sulfonic acid are emulsified by any desired method and polymerized by shaking for three days at 60° C. There is obtained in a quantitative yield a latex-like mass, from which by coagulation a plastic, strong rubber-like polymerization product of very satisfactory strength is produced.

Example 4

18 parts by weight of acrylic acid nitrile
100 parts by weight of butadiene-(1.3)
200 parts by weight of a 10% aqueous solution of the sodium salt of isobutylnaphthalene sulfonic acid are emulsified and shaken for three days at 60° C. After coagulation of the latex-like mass first formed, there is obtained in quantitative yield a plastic, strong polymerization product of very satisfactory rubber-like properties.

Example 5

30 parts by weight of methacrylic acid nitrile $$CH_2=C-C\equiv N$$
$$\quad\quad |$$
$$\quad\quad CH_3$$

70 parts by weight of butadiene-(1.3)
60 parts by weight of a 10% aqueous solution of the sodium salt of isobutylnaphthalene sulfonic acid
60 parts by weight of a 3% aqueous solution of the hydrochloric acid salt of diethylaminoethoxyoleylanilide are emulsified and polymerized by intensely shaking for three days at about 60° C. A cream-like mass, capable of dispersing in water, which can be coagulated with methyl alcohol, is thus obtained in a quantitative yield. The coagulate thus obtained shows excellent rubber-like properties.

We claim:—

1. The process which comprises mixing a butadiene hydrocarbon of the formula

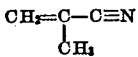

wherein $x$ means hydrogen or methyl with a compound of the formula

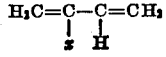

wherein R means hydrogen or methyl, in an amount that the mixture contains above about 60% by weight of the butadiene hydrocarbon, and polymerizing the mixture.

2. The process which comprises mixing a butadiene hydrocarbon of the formula

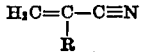

wherein $x$ means hydrogen or methyl with a compound of the formula

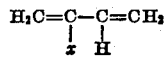

wherein R means hydrogen or methyl in an amount that the mixture contains above about 60% by weight of the butadiene hydrocarbon, and polymerizing the mixture by heating it to a temperature between about 30° and about 100° C.

3. Process which comprises emulsifying a mixture of a butadiene hydrocarbon of the formula

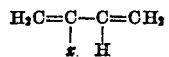

wherein $x$ means hydrogen or methyl, and of a compound of the formula

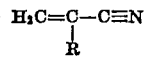

wherein R means hydrogen or methyl, said mixture containing the butadiene hydrocarbon in an amount surmounting about 60% by weight of the polymerizable compounds present, with water in the presence of a compound of the group consisting of emulsifying agents and emulsoid colloids, and polymerizing the polymerizable compounds in the emulsion thus formed.

4. Process which comprises emulsifying a mixture of a butadiene hydrocarbon of the formula

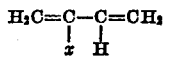

wherein $x$ means hydrogen or methyl, and of a compound of the formula

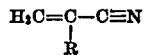

wherein R means hydrogen or methyl, said mixture containing the butadiene hydrocarbon in an amount surmounting about 60% by weight of the polymerizable compounds present, with water in the presence of a compound of the group consisting of emulsifying agents and emulsoid colloids, and heating the emulsion to a temperature between about 30° and about 100° C.

5. Rubber-like masses comprising a butadiene hydrocarbon, of the formula

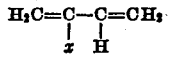

wherein $x$ means hydrogen or methyl, interpolymerized with a compound of the formula

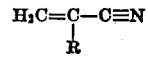

wherein R means hydrogen or methyl, in an amount that the mixture contains above about 60 per cent by weight of the butadiene hydrocarbon, and having, after vulcanization, a higher strength and resistance to attrition than a corresponding polymerization product of said butadiene hydrocarbon alone.

6. Rubber-like masses, comprising a butadiene hydrocarbon of the formula

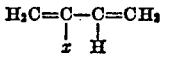

wherein $x$ means hydrogen or methyl, emulsion-interpolymerized with a compound of the formula

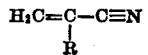

wherein R means hydrogen or methyl, in an amount that the mixture contains above about 60 per cent by weight of the butadiene hydrocarbon, and having, after vulcanization, a higher strength and resistance to attrition than a corresponding polymerization product of said butadiene hydrocarbon alone.

7. Rubber-like masses, comprising a butadiene hydrocarbon of the formula $$H_2C=C-C=CH_2$$
$$\phantom{H_2C=C}|\phantom{-}|$$
$$\phantom{H_2C=C}x\phantom{-}H$$

wherein $x$ means hydrogen or alkyl, interpolymerized with up to 40 per cent its weight of acrylic nitrile and having, after vulcanization, a higher strength and resistance to attrition than a corresponding polymerization product of said butadiene hydrocarbon alone.

8. Rubber-like masses, comprising a butadiene hydrocarbon of the formula $$H_2C=C-C=CH_2$$
$$\phantom{H_2C=C}|\phantom{-}|$$
$$\phantom{H_2C=C}x\phantom{-}H$$

wherein $x$ means hydrogen or alkyl, emulsion-interpolymerized with up to 40 per cent its weight of acrylic nitrile and having, after vulcanization, a higher strength and resistance to attrition than a corresponding polymerization product of said butadiene hydrocarbon alone.

9. Rubber-like masses comprising butadiene-(1.3) emulsion-interpolymerized with up to 40 per cent its weight of acrylic nitrile and having, after vulcanization, a higher strength and resistance to attrition than a corresponding polymerization product of said butadiene hydrocarbon alone.

ERICH KONRAD.
EDUARD TSCHUNKUR.